United States Patent
Stevens

(10) Patent No.: US 6,682,838 B2
(45) Date of Patent: Jan. 27, 2004

(54) INTEGRATED FUEL PROCESSOR, FUEL CELL STACK, AND TAIL GAS OXIDIZER WITH CARBON DIOXIDE REMOVAL

(75) Inventor: James F. Stevens, Katy, TX (US)

(73) Assignee: Texaco Inc., San Ramon, CA (US)

( * ) Notice: Subject to any disclaimer, the term of this patent is extended or adjusted under 35 U.S.C. 154(b) by 14 days.

(21) Appl. No.: 10/126,679

(22) Filed: Apr. 18, 2002

(65) Prior Publication Data

US 2002/0155329 A1 Oct. 24, 2002

Related U.S. Application Data

(60) Provisional application No. 60/284,684, filed on Apr. 18, 2001.

(51) Int. Cl.$^7$ .................................................. H01M 8/04
(52) U.S. Cl. ............................ 429/17; 429/19; 429/20; 429/26; 429/13
(58) Field of Search ............................ 429/12, 13, 14, 429/17, 19, 20, 26

(56) References Cited

U.S. PATENT DOCUMENTS 6,190,623 B1 * 2/2001 Sanger et al. ................ 422/192
6,551,733 B2 * 4/2003 Peschke et al. ................ 429/13

FOREIGN PATENT DOCUMENTS

| EP | 0920064 A1 | 6/1999 |
|----|-----------|--------|
| EP | 1018485 | * 7/2000 |

OTHER PUBLICATIONS

Balasubramanian, B., et al., "Hydrogen from Methane in a Single–Step Process," *Chemical Engineering Science*, Vo. 54 (1999), pp. 3543–3552, XP002212892, Oxford, GB, ISSN: 0009–2509.

Ding, Y., et al., "Adsorption–Enhanced Steam–Methane Reforming," *Chemical Engineering Science*, vol. 55 (2000), pp. 3929–3940, XP002212893, Oxford, GB, ISSN: 0009–2509.

Kurdyumov, S.S., et al., "Steam Conversion of Methane in the Presence of a Carbon Dioxide Acceptor," *Petroleum Chemistry*, vol. 36, No. 2 (1996), pp. 139–143, XP008008064; Pergamon, Oxford, GB, ISSN: 0965–5441.

* cited by examiner

*Primary Examiner*—Bruce F. Bell
(74) *Attorney, Agent, or Firm*—Howrey, Simon, Arnold & White, LLP; Frank C. Turner

(57) ABSTRACT

An illustrative method for converting hydrocarbon fuel to hydrogen rich gas, includes the steps of: reacting the hydrocarbon fuel with steam in the presence of reforming catalyst and a carbon dioxide fixing material to produce a first hydrogen gas; and removing carbon monoxide from the first hydrogen gas to produce the hydrogen rich gas, wherein the removing step utilizes a process selected from methanation or selective oxidation. In one illustrative embodiment the carbon dioxide fixing material is selected from calcium oxide, calcium hydroxide, strontium oxide, strontium hydroxide, allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite, and similar such materials and any combination of these. The reforming catalyst in one preferred and illustrative embodiment is selected from nickel, platinum, rhodium, palladium, ruthenium, or similar supported reforming catalysts or combinations of these. In such instances the reforming catalyst is preferably supported on a high surface area support thus promoting the reforming reaction and more preferably is selected from alumina, titania, zirconia, or similar such compounds or combinations of these. It is preferred that in one illustrative embodiment that the temperature of the reacting step is from about 400° C. to about 800° C.

35 Claims, 6 Drawing Sheets

INTEGRATED FUEL PROCESSOR, FUEL CELL STACK, AND TAIL GAS OXIDIZER WITH CARBON DIOXIDE REMOVAL

Priority of U.S. Provisional Patent Application No. 60/284,684, filed Apr. 18, 2001 is claimed under 35 U.S.C. §119.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is generally proportional to the consumption rate of the reactants.

A significant disadvantage which inhibits the wider use of fuel cells is the lack of a widespread hydrogen infrastructure. Hydrogen has a relatively low volumetric efficiency and is more difficult to store and transport than the hydrocarbon fuels currently used in most power generation systems. One way to overcome this difficulty is the use of reformers to convert the hydrocarbons to a hydrogen-rich gas stream that can be used as a feed for fuel cells.

Fuel reforming processes, such as steam reforming, partial oxidation, and autothermal reforming, can be used to convert hydrocarbon fuels such as natural gas, LPG, gasoline, and diesel, into a hydrogen rich gas. In addition to the desired product hydrogen, undesirable byproduct compounds such as carbon dioxide and carbon monoxide are found in the product gas. For many uses, such as fuel for proton exchange membrane (PEM) or alkaline fuel cells, these contaminants reduce the value of the product gas.

In a conventional steam reforming process, a hydrocarbon feed, such as methane, natural gas, propane, gasoline, naphtha, or diesel, is vaporized, mixed with steam, and passed over a steam reforming catalyst. The majority of the feed hydrocarbon is converted to a mixture of hydrogen, carbon monoxide, and carbon dioxide. The reforming product gas is typically fed to a water-gas shift bed in which much of the carbon monoxide is reacted with steam to form carbon dioxide and hydrogen. After the shift step, additional purification steps are needed to bring the hydrogen purity to the desired level. These steps include, but are not limited to, selective oxidation to remove remaining carbon monoxide, flow through a hydrogen permeable membrane, and pressure swing absorption.

For use in a PEM fuel cell the reformate hydrogen purity that is specified can vary widely between 35% and 99.999% with very low (<50 ppm) carbon monoxide level desirable. Generally, higher hydrogen purity improves fuel cell efficiency and cost. For alkaline fuel cells, low carbon dioxide levels are needed to prevent formation of carbonate salts. For these and other applications, an improved steam reforming process capable of providing a high hydrogen, low carbon monoxide, low carbon dioxide reformate is greatly desired.

SUMMARY OF THE INVENTION

The present disclosure is generally directed to a method for converting hydrocarbon fuel to hydrogen rich gas. In one such illustrative embodiment, the method includes: reacting the hydrocarbon fuel with steam in the presence of reforming catalyst and a carbon dioxide fixing material to produce a first hydrogen gas; and removing carbon monoxide from the first hydrogen gas to produce the hydrogen rich gas. The carbon monoxide removing step utilizes either methanation or selective oxidation. The carbon dioxide fixing material is preferably selected so as to substantially reduce the content of the carbon dioxide present in the hydrogen containing gas. Illustrative materials include calcium oxide, calcium hydroxide, strontium oxide, strontium hydroxide, or minerals such as allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, and strontio, dressenite and other such materials or any combinations of these. The reforming catalyst may be any suitable hydrocarbon reforming catalyst, but preferably, the reforming catalyst metal component is selected from nickel, platinum, rhodium, palladium, ruthenium, or any effective combination of these. One of skill in the art should know and appreciate that the reforming catalyst metal is preferably supported on a high surface area, inert support material. Such supports may be selected from alumina, titania, zirconia, or similar such materials or combinations of these. The temperature of the reacting step should be maintained in a range that is sufficient to support the reforming reaction and to achieve the desired outcome of producing a hydrogen rich gas. In one preferred and illustrative embodiment, the temperature of the reacting step is maintained in a range from about 400° C. to about 800° C., more preferably a temperature range of about 450° C. to about 700° C. is used and especially preferred is a temperature for the reacting step from about 500° C. to about 650° C. The illustrative method is carried out such that the hydrogen rich gas is suitable for use in a fuel cell and more preferably has a carbon monoxide concentration less than about 10 wppm.

The present disclosure also encompasses a method for operating a fuel cell. Such an illustrative and preferred method includes: reacting a hydrocarbon fuel with steam in the presence of reforming catalyst and carbon dioxide fixing material to produce a first hydrogen gas; and removing carbon monoxide from the first hydrogen gas to produce a hydrogen rich gas. The removing of carbon monoxide step preferably utilizes a process for substantially decreasing the content of the carbon monoxide present in the hydrogen containing gas such as methanation or selective oxidation. Once generated, the hydrogen rich gas is fed to the anode of the fuel cell, in which the fuel cell consumes a portion of the hydrogen rich gas and produces electricity, an anode tail gas, and a cathode tail gas. The illustrative method may further include feeding the anode tail gas and the cathode tail gas to an anode tail gas oxidizer to produce an exhaust gas. As an alternative the cathode tail gas may be substituted by another oxygen gas source and combined with the anode tail gas and combusted to achieve substantially the same results. The exhaust gas so generated may subsequently be used to regenerate the carbon dioxide fixing material.

Further integration of the process is contemplated such that the method may include preheating process water with the anode tail gas and the cathode tail gas, such that the preheated process water is used to regenerate the carbon dioxide fixing material. The carbon dioxide fixing material may be selected from any suitable material that substantially decreases the content of the carbon dioxide in the hydrogen containing gas. Preferably, the carbon dioxide fixing material is selected from calcium oxide, calcium hydroxide, strontium oxide, strontium hydroxide, or similar mineral materials such as allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio and dressenite and such materials or any combination of these. The temperature of the reacting step should be maintained in a range that is sufficient to support the reforming reaction and to achieve the desired outcome of producing a hydrogen rich gas. In one preferred and illustrative embodiment, the temperature of the reacting step is maintained in a range from about 400° C. to about 800° C., more preferably a temperature range of about 450° C. to about 700° C. is used and especially preferred is a temperature for the reacting step from about 500° C. to about 650° C. The illustrative method is carried out such that the hydrogen rich gas is suitable for use in a fuel cell and more preferably has a carbon monoxide concentration less than about 10 wppm.

Other illustrative methods of the present invention include: a method for operating a fuel cell, including: reacting the hydrocarbon fuel with steam in the presence of reforming catalyst and a material selected from calcium oxide, calcium hydroxide, strontium oxide, or strontium hydroxide to produce a first hydrogen gas, wherein the reaction temperature is from about 500° C. to about 650° C.; methanating the first hydrogen gas to produce a hydrogen rich gas having a carbon monoxide concentration less than about 10 wppm; feeding the hydrogen rich gas to the anode of the fuel cell, wherein the fuel cell consumes a portion of the hydrogen rich gas and produces electricity, an anode tail gas, and a cathode tail gas; and feeding the anode tail gas and the cathode tail gas to an anode tail gas oxidizer to produce an exhaust gas.

Another encompassed method includes a method for operating a fuel cell, including: reacting the hydrocarbon fuel with steam in the presence of reforming catalyst and a material selected from calcium oxide, calcium hydroxide, strontium oxide, or strontium hydroxide to produce a first hydrogen gas, wherein the reaction temperature is from about 500° C. to about 650° C.; methanating the first hydrogen gas to produce a hydrogen rich gas having a carbon monoxide concentration less than about 10 wppm; feeding the hydrogen rich gas to the anode of the fuel cell, wherein the fuel cell consumes a portion of the hydrogen rich gas and produces electricity, an anode tail gas, and a cathode tail gas; and preheating process water with the anode tail gas and the cathode tail gas, wherein the preheated process water is used to regenerate the carbon dioxide fixing material.

The present disclosure also encompasses an apparatus for producing electricity from hydrocarbon fuel, that substantially carries out one or more of the methods disclosed herein. In one such illustrative embodiment, the apparatus includes: at least two reforming catalyst beds, in which each reforming catalyst bed is composed of a reforming catalyst and carbon dioxide fixing material; a first manifold that is capable of diverting a feed stream between the at least two reforming catalyst beds; a reactor that is capable of producing a hydrogen rich gas by reducing the carbon monoxide concentration of the effluent of at least one of the reforming catalyst beds; and a second manifold that is capable of diverting the effluent of each reforming catalyst bed effluent between the reactor and exhaust. In one preferable and illustrative embodiment, the reactor is designed such that the level of carbon monoxide in the hydrogen containing gas is selectively and substantially decreased and more preferably is a methanation reactor or a selective oxidation reactor. The illustrative apparatus further includes a fuel cell that produces electricity and converts the hydrogen rich gas to anode tail gas and cathode tail gas. Another illustrative apparatus includes a metal hydride storage system that stores the hydrogen rich gas for use at a latter time. Yet another illustrative embodiment includes an anode tail gas oxidizer that combusts the anode tail gas and cathode tail gas to produce an exhaust gas. A third manifold can also be included in the illustrative apparatus disclosed herein that is capable of diverting the exhaust gas to at least one of the reforming catalyst beds for regeneration. The illustrative apparatus can be designed such that a water preheater is included, in which the water preheater heats process water using the anode tail gas and the cathode tail gas. Alternatively, the first manifold can be designed such that the first manifold is capable of diverting the preheated water to at least one of the reforming catalyst beds for regeneration.

BRIEF DESCRIPTION OF THE DRAWINGS

The description is presented with reference to the accompanying drawings in which.

DETAILED DESCRIPTION OF EMBODIMENTS

Figure 1:
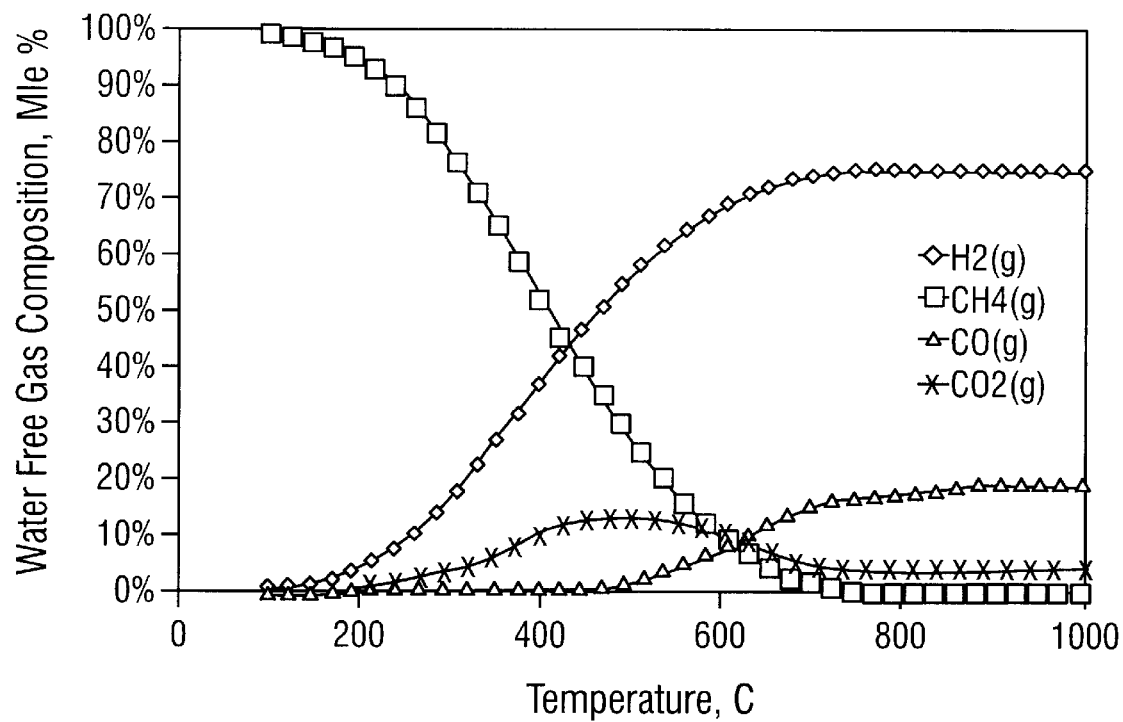
FIG. 1 shows the predicted product gas composition (water free basis) from a steam reformer as a function of reaction temperature.

The present invention is generally directed to a method and apparatus for converting hydrocarbon fuel into a hydrogen rich gas. The present invention simplifies the conversion process by incorporating a carbon dioxide fixing material into the initial hydrocarbon conversion process as shown in FIG. 1. This fixing material can be any substance capable of reacting with carbon dioxide and retaining carbon dioxide in a temperature range included in the temperatures range typical of hydrocarbon conversion to hydrogen and carbon dioxide. Substances capable of fixing carbon dioxide in suitable temperature ranges include, but are not limited to, calcium oxide (CaO), calcium hydroxide (Ca(OH)$_2$), strontium oxide (SrO), and strontium hydroxide (Sr(OH)$_2$). Also suitable are mineral compounds such as allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite and similar such compounds.

FIG. 1 shows the predicted product gas composition (water free basis) from a steam reformer as a function of reaction temperature. The feed for this thermodynamic calculation was 1 mole methane and 2 moles water. At temperatures in excess of 700° C., greater than 90% of the methane has been converted to hydrogen, carbon monoxide, and carbon dioxide. The predicted composition is reasonably close to that seen experimentally when an active reforming catalyst is used. As can be seen from FIG. 1, the product gas generally contains greater than 15% carbon monoxide and about 5% carbon dioxide. After a water gas shift step to convert most of the carbon monoxide to hydrogen and carbon dioxide, additional purification steps are necessary before use in a PEM or alkaline fuel cell or with a metal hydride storage system.

Figure 2:
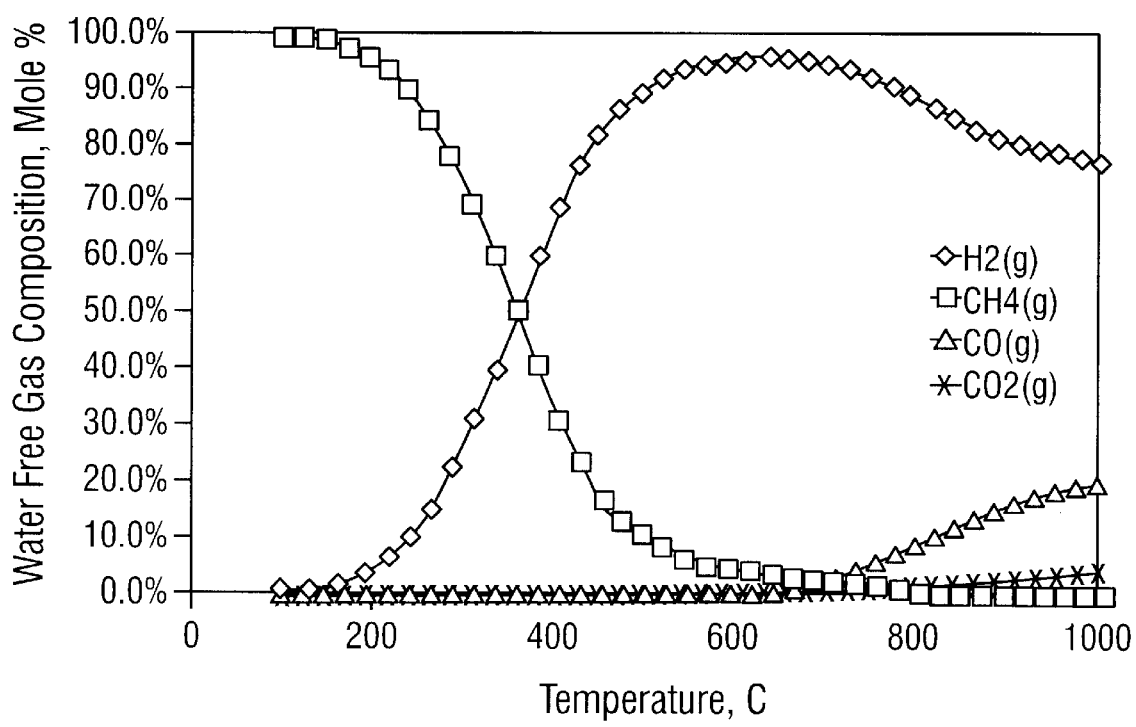
FIG. 2 shows the predicted product gas composition (water free basis) as a function of the reaction temperature when the same feed gas composition is reacted in the presence of calcium oxide.

FIG. 2 shows the predicted product gas composition as a function of the reaction temperature when the same feed gas composition is reacted in the presence of calcium oxide. Calcium hydroxide is also present due to the reaction of water with calcium oxide. As can be seen in FIG. 2, at 650° C., the predicted gas composition (water free basis) is greater than 95% hydrogen, less than 1% carbon monoxide, less than 0.1% carbon dioxide, with the balance of the gas as unconverted methane. With a product gas of this composition, no water-gas shift step would be needed. For a PEM fuel cell, only selective oxidation would be needed to make the product gas a highly desirable fuel. For alkaline fuel cells or for a feed to a metal hydride storage system, a methanation step to convert carbon monoxide and carbon dioxide to methane would create a highly desirable feed. In the aforementioned uses, a tail gas with unused hydrogen and methane would be available to provide the energy needed to convert the methane to hydrogen.

Additional thermodynamic predictions show that other feeds, including but not limited to propane, diesel, methanol, and ethanol, would produce improved reformate streams if steam reformed in the presence of calcium oxide. Thermodynamic calculations also predict that strontium and magnesium oxides could be used in place of or in conjunction with calcium oxides.

Figure 3:
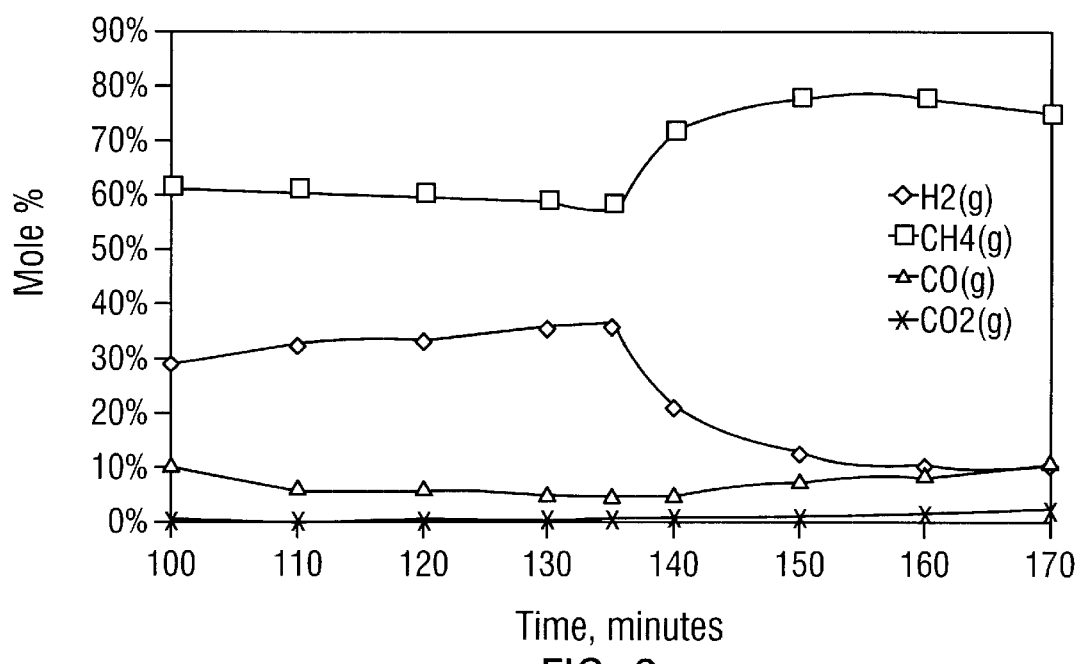
FIG. 3 shows the experimental results using a 0.5% rhodium on alumina reforming catalyst mixed with calcium oxide extrudates.

FIG. 3 shows the experimental results using a 0.5% rhodium on alumina reforming catalyst mixed with calcium oxide extrudates. The extrudates were made by combining calcium hydroxide (33% by weight) with a clay (AMOCO No. X-11), extruding, and calcining at 600° C. in air. As can be seen in FIG. 3, the product reformate contained about 80% hydrogen, 10% unreacted methane, 10% carbon monoxide, and little carbon dioxide. It is believed that the addition of a catalyst capable of improving the reaction rate of water and carbon monoxide will reduce the concentration of carbon monoxide in the product gas.

It is important to note that the catalyst bed is comprised of a mixture of catalyst(s) and carbon dioxide fixing materials. The carbon dioxide fixing material can be a mixture of calcium, strontium, or magnesium salts combined with binding materials such as silicates or clays that prevent the carbon dioxide fixing material from becoming entrained in the gas stream and reduce crystallization that decreases surface area and carbon dioxide absorption. Salts used to make the initial bed can be any salt, such as an oxide or hydroxide, that will convert to the carbonate under process conditions. The catalyst(s) in this system serve multiple functions. One function is to catalyze the reaction of hydrocarbon with steam to give a mixture of hydrogen, carbon monoxide, and carbon dioxide. Another function is to catalyze the shift reaction between water and carbon monoxide to form hydrogen and carbon dioxide. Many chemical species can provide these functions, including rhodium, platinum, gold, palladium, rhenium, nickel, iron, cobalt, copper, and other metal based catalysts.

An important factor in this process is the recognition that the improved reformate composition is obtained by the reaction of calcium oxide with carbon dioxide to form calcium carbonate. The calculations shown in FIGS. 2 and 3 also demonstrate that the carbon dioxide fixing material can be regenerated by heating to a higher temperature and allowing the $CaCO_3$ or $SrCO_3$ to release carbon dioxide and be reconverted to the original carbon dioxide fixing material. Heating of the carbon dioxide fixing material may be accomplished by a number of differing means known to one of skill in the art. In one such illustrative example the heating is accomplished by electrically resistant heating coils. Alternatively, a heat exchanger may be incorporated into the design of the reactor such that steam, exhaust or other heat source such as heat pipes heat the reactor. Another alternative is to heat the carbon dioxide fixing material by flowing gas through the bed under conditions in which the calcium carbonate or strontium carbonate is decomposed and the carbon dioxide is removed. This has been done in our labs using helium, nitrogen, and steam. It could also be done using the anode tail gas of a fuel cell or the tail gas of a metal hydride storage system.

It is envisioned that the system will have two or more reforming beds such that one or more beds are generating reformate while the remaining beds are being regenerated. An integrated system in which tail gas from the fuel cell and/or hydrogen storage system is used to provide heat needed to reform the feed fuel and regenerate the calcium oxide bed.

Figure 4:
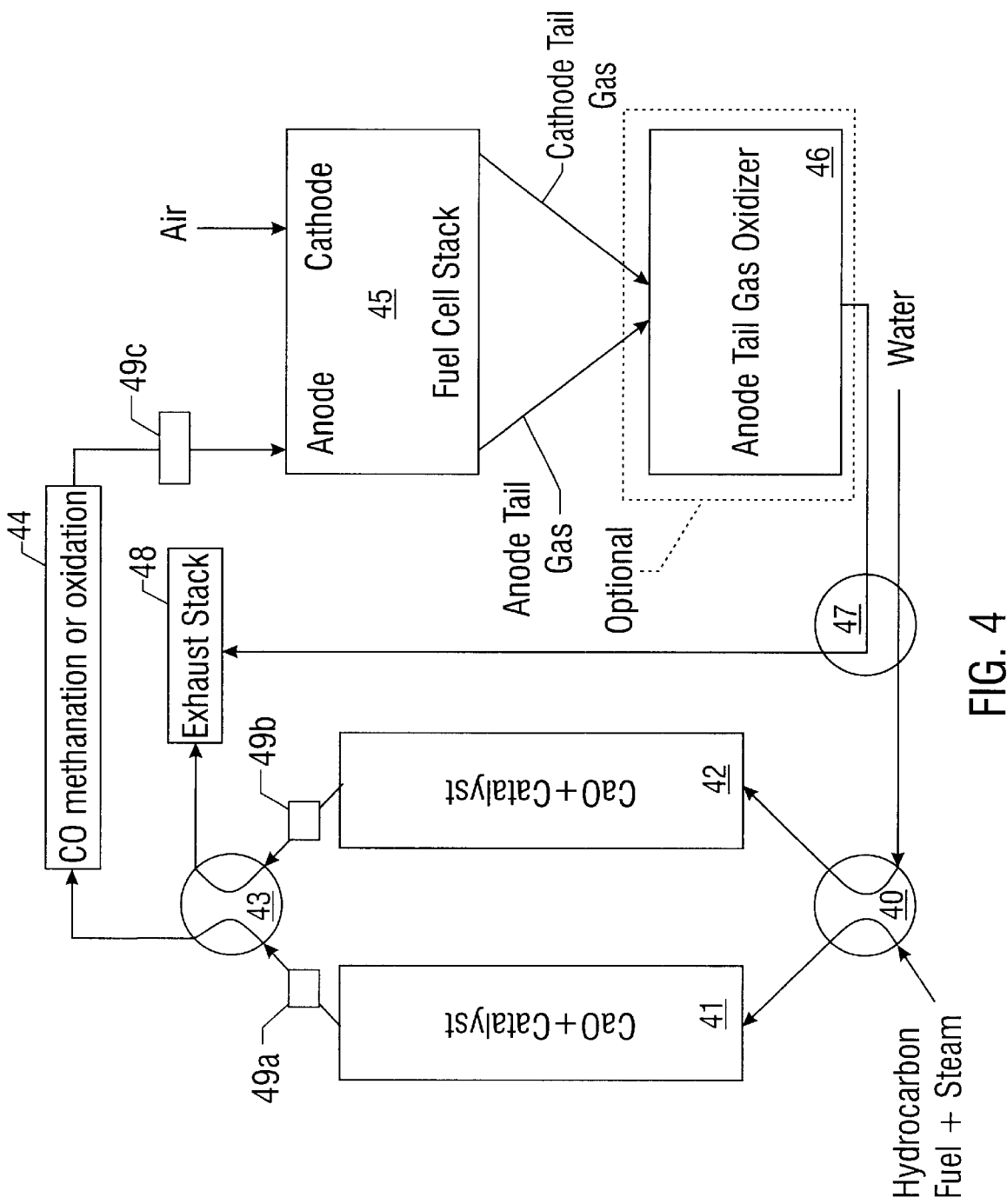
FIG. 4 shows one preferred embodiment of the present invention.

FIG. 4 shows a preferred embodiment of the present invention. Hydrocarbon fuel and steam are mixed and flow into manifold or valve 40 that directs the mixture to reforming catalyst bed 41 or 42. Reforming catalyst beds 41 and 42 are comprised of a mixture of reforming catalyst and carbon dioxide fixing materials. The reforming catalysts are typically nickel, platinum, rhodium, palladium, and/or ruthenium metals deposited on a high surface area support such as alumina, titania, or zirconia with other materials added as promoters or stabilizers. It is important that the catalyst be stable at the high temperatures needed for regenerating the carbon dioxide fixing material. In FIG. 4, the carbon dioxide fixing material is shown as calcium oxide. Upon contacting the active catalyst bed the hydrocarbon feed gas is converted to hydrogen, carbon monoxide and carbon dioxide. The carbon dioxide fixing material removes the carbon dioxide from the stream and shifts the reaction equilibrium toward high hydrocarbon conversion with only small amounts of carbon monoxide being produced. The low level of carbon monoxide production allows the elimination of water-gas shift catalysts currently used in most fuel processors.

The reformate from bed reforming catalyst bed 41 or 42 is cooled by optionally present heat exchangers 49a and 49b and then flows into manifold or valve 43 that directs the reformate to a polishing step 44 that removes carbon monoxide and possibly carbon dioxide. The low levels of carbon monoxide are reduced to trace levels <10 ppm through selective oxidation or methanation. It is expected that the removal of carbon dioxide will make methanation the desired process, although selective oxidation is also envisioned by the present invention. The purified reformate stream (hydrogen rich gas) is optionally cooled in a heat exchanger 49c and then flows to the anode of fuel cell 45. The fuel cell 45 typically uses 70 to 80% of the hydrogen to produce electricity while the methane flows through the anode unchanged. Alternatively, the hydrogen rich gas can be stored in a metal hydride storage system (not shown), for later use as feed to fuel cell 45.

Still with reference to FIG. 4, the anode tail gas is then combined with the cathode tail gas, and is combusted in anode tail gas oxidizer 46. Exhaust from the anode tail gas oxidizer 46 is then passed through a heat exchanger 47 and to exhaust stack 48. Water is heated in heat exchanger 47 and is used as steam feed for the beginning of the process, and is flowed through manifold or valve 40 to regenerate one of the reforming catalyst beds 41 or 42. Once the carbon dioxide fixing material is regenerated the heated process water is diverted away from the regenerated bed. Heating of the carbon dioxide fixing material may be accomplished by a number of differing means known to one of skill in the art. In one such illustrative example the heating is accomplished by electrically resistant heating coils. Alternatively, a heat exchanger may be incorporated into the design of the reactor such that steam, exhaust or other heat source such as heat pipes heat the reactor. Another alternative is to heat the carbon dioxide fixing material by flowing gas through the bed under conditions in which the calcium carbonate or strontium carbonate is decomposed and the carbon dioxide is removed. This has been done in our labs using helium, nitrogen, and steam. It could also be done using the anode tail gas of a fuel cell or the tail gas of a metal hydride storage system. Once the regenerated bed cools to the desired hydrogen conversion temperature range the catalyst beds can be switched and another bed can be regenerated.

The tail gas from the regeneration flows through manifold or valve 43 and out of the exhaust header. Alternatively, FIG. 4 demonstrates that the anode tail gas oxidizer 46 can optionally be left out of the process. In such a scheme, the anode tail gas and the cathode tail gas are directly passed through heat exchanger 47 and to exhaust stack 48.

Figure 5:
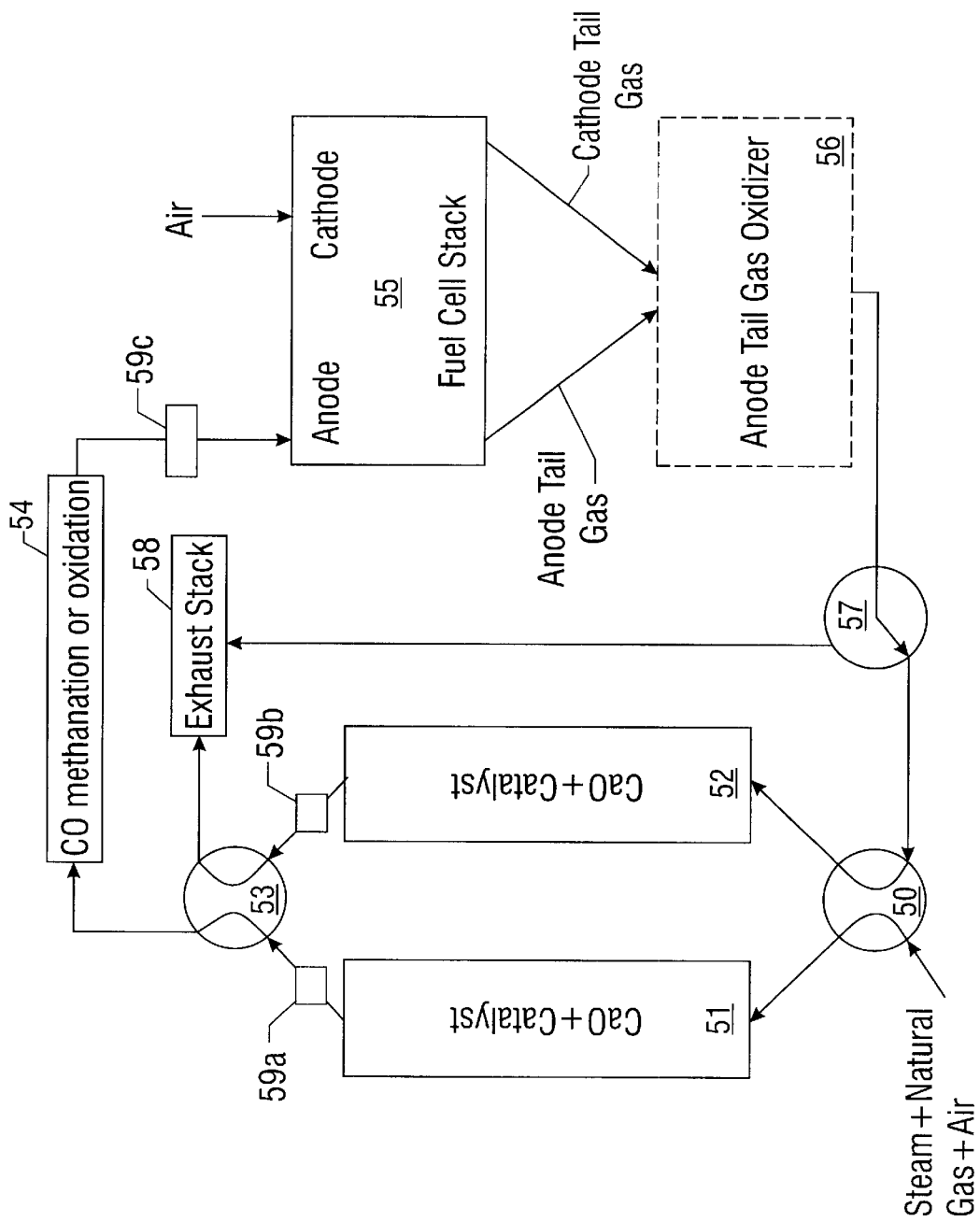
FIG. 5 shows another preferred embodiment of the present invention.

FIG. 5 shows an another preferred embodiment of the present invention. Hydrocarbon fuel and steam are mixed and flowed into manifold or valve 50 that directs the mixture to reforming catalyst bed 51 or 52. Reforming catalyst beds 51 and 52 are comprised of a mixture of reforming catalyst and carbon dioxide fixing materials. The reforming catalysts are typically nickel, platinum, rhodium, palladium, ruthenium metals deposited on a high surface area support such as alumina, titania, or zirconia with other materials added as promoters or stabilizers. It is important that the catalyst be stable at the high temperatures needed for regenerating the carbon dioxide fixing material. In FIG. 5, the carbon dioxide fixing material is shown as calcium oxide. Upon contacting the active catalyst bed the hydrocarbon feed gas is converted to hydrogen and $CO_2$. The carbon dioxide fixing material removes the carbon dioxide from the stream and shifts the reaction equilibrium toward high hydrocarbon conversion with only small amounts of carbon monoxide being produced. The low level of carbon monoxide production allows the elimination of water-gas shift catalysts currently used in most fuel processors.

The reformate from bed reforming catalyst bed 51 or 52 is cooled by optionally present heat exchangers 59a and 59b and then flows into manifold or valve 53 that directs the reformate to a polishing step 54 that removes carbon monoxide and possibly carbon dioxide. The low levels of carbon monoxide are reduced to trace levels <10 ppm through selective oxidation or methanation. It is expected that the removal of carbon dioxide will make methanation the desired process, although selective oxidation is also envisioned by the present invention. The purified reformate stream (hydrogen rich gas) is cooled by optionally present heat exchanger 59c and then flows to the anode of fuel cell 55. The fuel cell 55 typically uses 70 to 80% of the hydrogen to produce electricity while the methane flows through the anode unchanged. Alternatively, the hydrogen rich gas can be stored in a metal hydride storage system (not shown), for later use as feed to fuel cell 55.

Still with reference to FIG. 5, the anode tail gas is then combined with the cathode tail gas, and is combusted in anode tail gas oxidizer 56. Exhaust gas from the anode tail gas oxidizer 56 passes through manifold or valve 57 and manifold or valve 50, and is used to regenerate one of the reforming catalyst beds 51 or 52. Once the carbon dioxide fixing material is regenerated, the exhaust gas is switched to bypass the catalyst beds using manifold 57. Heating of the carbon dioxide fixing material may be accomplished by a number of differing means known to one of skill in the art. In one such illustrative example the heating is accomplished by electrically resistant heating coils. Alternatively, a heat exchanger may be incorporated into the design of the reactor such that steam, exhaust or other heat source such as heat pipes heat the reactor. Another alternative is to heat the carbon dioxide fixing material by flowing gas through the bed under conditions in which the calcium carbonate or strontium carbonate is decomposed and the carbon dioxide is removed. This has been done in our labs using helium, nitrogen, and steam. It could also be done using the anode tail gas of a fuel cell or the tail gas of a metal hydride storage system. Once the regenerated bed cools to the desired hydrogen conversion temperature range the catalyst beds can be switched and another bed can be regenerated. The tail gas from the regeneration flows through manifold or valve 53 and out of the exhaust header. Alternatively, the anode tail gas oxidizer 56 can optionally be left out of the process. In such a scheme, the anode tail gas and the cathode tail gas are directly passed through heat exchanger 47 and to exhaust stack 48.

Although both FIGS. 4 and 5 show two reforming catalyst reactors, it is intended by the present invention that more than two reforming catalyst beds may be utilized. For example, three reforming catalyst beds can be utilized in the following manner: one bed in operation, one bed in regeneration, and one bed cooling down from regeneration temperature to process temperature.

Figure 6:
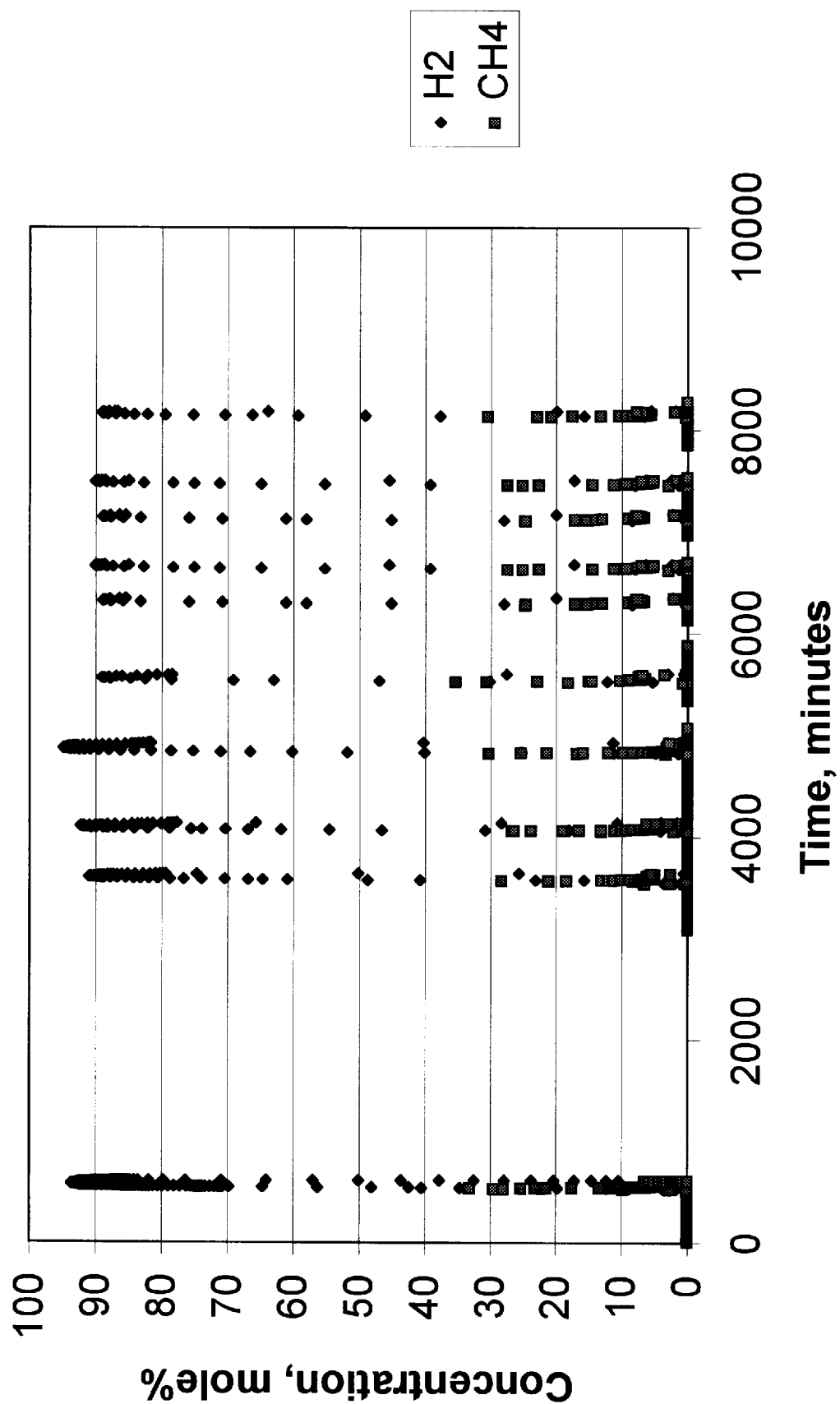
FIG. 6 graphically shows exemplary data of the hydrogen and methane concentration carrying out the method of the present invention.
Figure 7:
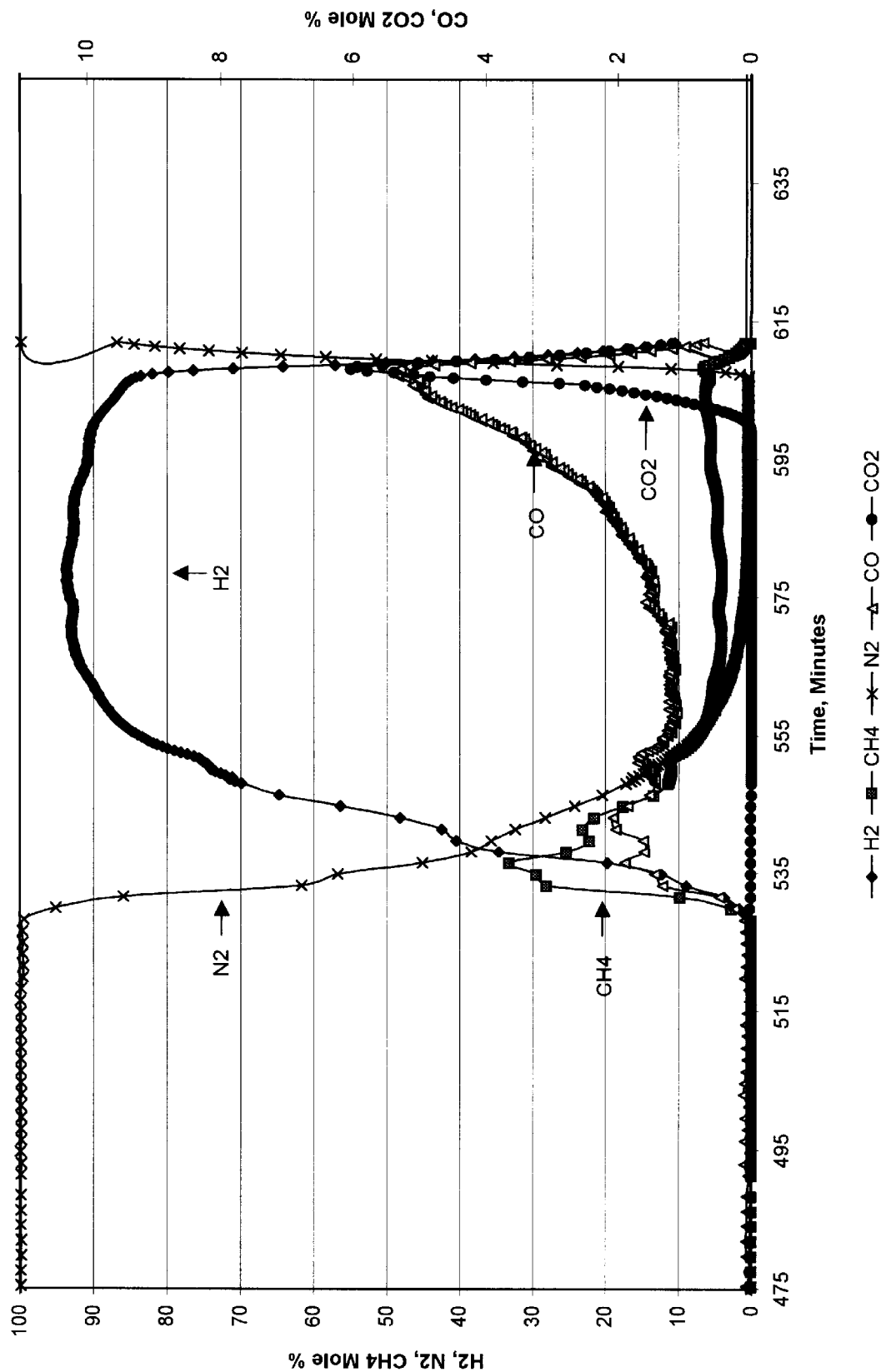
FIG. 7 graphically shows exemplary data on the composition of the gases resulting from carrying out the method of the present invention.

A series of tests were conducted in laboratory scale reactors of the type generally disclosed herein. In such tests, 69.6 g of dolomite available commercially as Dolcron 4013 and 9.5 g of a 0.5% rhodium on alumina, commercially available from Johnson Mathey, were loaded into a tube reactor. The reactor was heated to a temperature of 550° C. After flowing nitrogen through the catalyst bed for several hours, methane was introduced into the reactor at a rate of about 5.125 l/h until carbon dioxide was detected in the exiting gas. The test reactor bed was then regenerated by flowing nitrogen through the reactor and raising the reactor temperature to achieve a gas exit temperature of about 750° C. The representative data of 10 such cycles is shown graphically in FIG. 6. Illustrated in FIG. 7, is representative data that shows the first cycle in greater detail. One of skill in the art should understand and appreciate from this data that during the cycle, the hydrogen concentration reached a peak of about 93% accompanied by a total carbon oxide content below 1%. It should also be observed that the carbon dioxide concentration can be seen rising during the course of the test, especially after the 600 minute mark, indicating that the carbon dioxide absorption capacity of the dolomite is being reached. Upon careful review and consideration, a person of skill in the art should understand and appreciate that the above example and data illustrate the methods and apparatus of the present invention.

A skilled person in the art should also appreciate that the present invention also encompasses the following illustrative embodiments. One such illustrative embodiment includes a method for converting hydrocarbon fuel to hydrogen rich gas, comprising the steps of reacting the hydrocarbon fuel with steam in the presence of reforming catalyst and a carbon dioxide fixing material to produce a first hydrogen gas, and removing carbon monoxide from the first hydrogen gas, using either methanation or selective oxidation, to produce the hydrogen rich gas. The carbon dioxide fixing material may be selected from calcium oxide, calcium hydroxide, strontium oxide, strontium hydroxide, or any combination thereof. The reforming catalyst can be any reforming catalyst known to those of skill in the art, such as nickel, platinum, rhodium, palladium, ruthenium, or any combination thereof. Furthermore, the reforming catalyst can be supported on any high surface area support known to those of skill in the art, such as alumina, titania, zirconia, or any combination thereof. A preferred aspect of the present embodiment is a reforming reaction temperature in the range from about 400° C. to about 800° C., more preferably in the range from about 450° C. to about 700° C., and most preferably in the range from about 500° C. to about 650° C. It is expected that the present embodiment can easily achieve a hydrogen rich gas having a carbon monoxide concentration less than about 10 wppm.

Another illustrative embodiment of the present invention is a method for operating a fuel cell, comprising the steps of reacting a hydrocarbon fuel with steam in the presence of reforming catalyst and carbon dioxide fixing material to produce a first hydrogen gas, removing carbon monoxide from the first hydrogen gas, using either methanation or selective oxidation, to produce a hydrogen rich gas, and feeding the hydrogen rich gas to the anode of the fuel cell, wherein the fuel cell consumes a portion of the hydrogen rich gas and produces electricity, an anode tail gas, and a cathode tail gas. The anode tail gas and the cathode tail gas may then be fed to an anode tail gas oxidizer to produce an exhaust gas, such that exhaust gas is usable to regenerate the carbon dioxide fixing material. Alternatively, the anode tail gas and the cathode tail gas may be used to directly preheat process water, such that the heated process water is usable to regenerate the carbon dioxide fixing material. The carbon dioxide fixing material may be selected from calcium oxide, calcium hydroxide, strontium oxide, strontium hydroxide, or any combination thereof. The reforming catalyst can be any reforming catalyst known to those of skill in the art, such as nickel, platinum, rhodium, palladium, ruthenium, or any combination thereof. Furthermore, the reforming catalyst can be supported on any high surface area support known to those of skill in the art, such as alumina, titania, zirconia, or any combination thereof. A preferred aspect of the present embodiment is a reforming reaction temperature in the range from about 400° C. to about 800° C., more preferably in the range from about 450° C. to about 700° C., and most preferably in the range from about 500° C. to about 650° C. It is expected that the present embodiment can easily achieve a hydrogen rich gas having a carbon monoxide concentration less than about 10 wppm.

Yet another illustrative embodiment of the present invention is an apparatus for producing electricity from hydrocarbon fuel, comprising at least two reforming catalyst beds, wherein each reforming catalyst bed comprises reforming catalyst and carbon dioxide fixing material, a first manifold capable of diverting a feed stream between the at least two reforming catalyst beds, a reactor, such as a methanation reactor or selective oxidation reactor, capable of producing a hydrogen rich gas by reducing the carbon monoxide concentration of the effluent of at least one of the reforming catalyst beds, and a second manifold capable of diverting the effluent of each reforming catalyst bed effluent between the reactor and exhaust. A fuel cell is also envisioned, producing electricity and converting the hydrogen rich gas to anode tail gas and cathode tail gas. Alternatively, the hydrogen rich gas can be stored in a metal hydride storage system as a source for later feed to a fuel cell. A preferred aspect of the present embodiment is an anode tail gas oxidizer that combusts the anode tail gas and cathode tail gas to produce an exhaust gas. A third manifold can then be utilized to divert the exhaust gas to each reforming catalyst bed for regeneration. Alternatively, a water preheater can be employed to heat process water using the anode tail gas and the cathode tail gas. The first manifold is then capable of diverting the preheated water to at least one of the reforming catalyst beds for regeneration. Alternatively, a water preheater can be employed to heat process water using the exhaust gas from the anode tail gas oxidizer. The first manifold is then capable of diverting the preheated water to at least one of the reforming catalyst beds for regeneration.

While the apparatus and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention.

I claim:

1. A method for converting hydrocarbon fuel to hydrogen rich gas, comprising the steps of:
reacting the hydrocarbon fuel with steam in the presence of reforming catalyst and a carbon dioxide fixing material to produce a first hydrogen gas;
removing carbon monoxide from the first hydrogen gas to produce the hydrogen rich gas, wherein the removing step utilizes a process selected from methanation or selective oxidation; and
regenerating the carbon dioxide fixing material by heating the carbon dioxide fixing material to a temperature of at least about 600° C.

2. The method of claim 1, wherein the carbon dioxide fixing material is selected from calcium oxide, calcium hydroxide, strontium oxide, strontium hydroxide, allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite or combinations thereof.

3. The method of claim 1, wherein the reforming catalyst is selected from nickel, platinum, rhodium, palladium, ruthenium, or any combination thereof.

4. The method of claim 3, wherein the reforming catalyst is supported on a high surface area support selected from alumina, titania, zirconia, or any combination thereof.

5. The method of claim 1, wherein the temperature of the reacting step is from about 400° C. to about 800° C.

6. The method of claim 1, wherein the temperature of the reacting step is from about 450° C. to about 700° C.

7. The method of claim 6, wherein the temperature of the reacting step is from about 500° C. to about 650° C.

8. The method of claim 7, wherein the hydrogen rich gas has a carbon monoxide concentration less than about 10 wppm.

9. A method for converting hydrocarbon fuel to hydrogen rich gas, comprising the steps of:
    reacting the hydrocarbon fuel with steam in the presence of reforming catalyst and a material selected from calcium oxide, calcium hydroxide, strontium oxide, strontium hydroxide allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite and combinations thereof, to produce a first hydrogen gas, wherein the reaction temperature is from about 500° C. to about 650° C.;
    methanating the first hydrogen gas to produce the hydrogen rich gas having a carbon monoxide concentration less than about 10 wppm; and
    regenerating the carbon dioxide fixing material by heating the carbon dioxide fixing material to a temperature of at least about 600° C.

10. A method for operating a fuel cell, comprising the steps of:
    reacting a hydrocarbon fuel with steam in the presence of reforming catalyst and carbon dioxide fixing material to produce a first hydrogen gas;
    removing carbon monoxide from the first hydrogen gas to produce a hydrogen rich gas, wherein the removing step utilizes a process selected from methanation or selective oxidation;
    regenerating the carbon dioxide fixing material by heating the carbon dioxide fixing material to a temperature of at least about 600° C.; and
    feeding the hydrogen rich gas to the anode of the fuel cell, wherein the fuel cell consumes a portion of the hydrogen rich gas and produces electricity, an anode tail gas, and a cathode tail gas.

11. The method of claim 10, further comprising feeding the anode tail gas and the cathode tail gas to an anode tail gas oxidizer to produce an exhaust gas.

12. The method of claim 11, wherein the exhaust gas is used to regenerate the carbon dioxide fixing material.

13. The method of claim 10, further comprising preheating process water with the anode tail gas and the cathode tail gas, wherein the preheated process water is used to regenerate the carbon dioxide fixing material.

14. The method of claim 10, wherein the carbon dioxide fixing material is selected from calcium oxide, calcium hydroxide, strontium oxide, strontium hydroxide, allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite or combinations thereof.

15. The method of claim 10, wherein the temperature of the reacting step is from about 400° C. to about 800° C.

16. The method of claim 15, wherein the temperature of the reacting step is from about 450° C. to about 700° C.

17. The method of claim 16, wherein the temperature of the reacting step is from about 500° C. to about 650° C.

18. The method of claim 10, wherein the hydrogen rich gas has a carbon monoxide concentration less than about 10 wppm.

19. A method for operating a fuel cell, comprising the steps of:
    reacting the hydrocarbon fuel with steam in the presence of reforming catalyst and a material selected from calcium oxide, calcium hydroxide, strontium oxide, strontium hydroxide, allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite burbankite, khanneshite, carboncernaite, brinkite, pryrauite, strontio dressenite or combinations thereof, to produce a first hydrogen gas, wherein the reaction temperature is from about 500° C. to about 650° C.;
    methanating the first hydrogen gas to produce a hydrogen rich gas having a carbon monoxide concentration less than about 10 wppm;
    regenerating the carbon dioxide fixing material by heating the carbon dioxide fixing material to a temperature of at least about 600° C.;
    feeding the hydrogen rich gas to the anode of the fuel cell, wherein the fuel cell consumes a portion of the hydrogen rich gas and produces electricity, an anode tail gas, and a cathode tail gas; and
    feeding the anode tail gas and the cathode tail gas to an anode tail gas oxidizer to produce an exhaust gas.

20. The method of claim 19, wherein the exhaust gas is used to regenerate the carbon dioxide fixing material.

21. A method for operating a fuel cell, comprising the steps of:
    reacting the hydrocarbon fuel with steam in the presence of reforming catalyst and a material selected from calcium oxide, calcium hydroxide, strontium oxide, strontium hydroxide, allanite, andralite, ankerite, anorthite, aragoniter, calcite, dolomite, clinozoisite, huntite, hydrotalcite, lawsonite, meionite, strontianite, vaterite, jutnohorite, minrecordite, benstonite, olekminskite, nyerereite, natrofairchildite, farichildite, zemkorite, butschlite, shrtite, remondite, petersenite, calcioburbankite, burbankite, khanneshite, carboncernaite, brinkite, pryrauite, strontio dressenite or combinations thereof, to produce a first hydrogen gas, wherein the reaction temperature is from about 500° C. to about 650° C.;
    methanating the first hydrogen gas to produce a hydrogen rich gas having a carbon monoxide concentration less than about 10 wppm;
    regenerating the carbon dioxide fixing material by heating the carbon dioxide fixing material to a temperature of at least about 600° C.;
    feeding the hydrogen rich gas to the anode of the fuel cell, wherein the fuel cell consumes a portion of the hydrogen rich gas and produces electricity, an anode tail gas, and a cathode tail gas; and
    preheating process water with the anode tail gas and the cathode tail gas, wherein the preheated process water is used to regenerate the carbon dioxide fixing material.

22. An apparatus for producing electricity from hydrocarbon fuel, comprising:
- at least two reforming catalyst beds, wherein each reforming catalyst bed comprises reforming catalyst and carbon dioxide fixing material; and
- a first manifold, wherein the first manifold is capable of diverting a feed stream between the at least two reforming catalyst beds such that one or more reforming catalyst beds are generating reformate while the remaining reforming catalyst beds are being regenerated.

23. The apparatus of claim 22, further comprising:
- a reactor, wherein the reactor is capable of producing a hydrogen rich gas by reducing the carbon monoxide concentration of the effluent of at least one of the reforming catalyst beds; and
- a second manifold, wherein the second manifold is capable of diverting the effluent of each reforming catalyst bed effluent between the reactor and exhaust.

24. The apparatus of claim 23, wherein the reactor is selected from a methanation reactor or a selective oxidation reactor.

25. The apparatus of claim 22, further comprising a fuel cell, wherein the fuel cell produces electricity and converts the hydrogen rich gas to anode tail gas and cathode tail gas.

26. The apparatus of claim 25, further comprising an anode tail gas oxidizer, wherein the anode tail gas oxidizer combusts the anode tail gas and cathode tail gas to produce an exhaust gas.

27. The apparatus of claim 26, further comprising a third manifold, wherein the third manifold is capable of diverting the exhaust gas to at least one of the reforming catalyst beds for regeneration.

28. The apparatus of claim 26, further comprising a water preheater, wherein the water preheater heats process water using the exhaust gas.

29. The apparatus of claim 28, wherein the first manifold is capable of diverting the preheated water to at least one of the reforming catalyst beds for regeneration.

30. The apparatus of claim 25, further comprising a water preheater, wherein the water preheater heats process water using the anode tail gas and the cathode tail gas.

31. The apparatus of claim 30, wherein the first manifold is capable of diverting the preheated water to at least one of the reforming catalyst beds for regeneration.

32. The apparatus of claim 22, further comprising a metal hydride storage system, wherein the metal hydride storage system stores the hydrogen rich gas.

33. A method for converting hydrocarbon fuel to a hydrogen rich gas, the method comprising the steps of:
- providing two or more reforming catalyst beds, wherein each reforming catalyst bed comprises a mixture of catalyst and carbon dioxide fixing material;
- generating reformate by directing a mixture comprising hydrocarbon fuel and steam to one or more of the reforming catalyst beds and reacting the mixture at a reforming reaction temperature between about 400° C. to about 800°C.; and
- regenerating one of the reforming catalyst beds by heating the carbon dioxide fixing material to a temperature higher than the reforming reaction temperature;

wherein reformate is generated while at least one of the reforming catalyst beds is being regenerated.

34. The method of claim 33, further comprising the step of allowing the regenerated carbon dioxide fixing material to cool to the reforming reaction temperature.

35. The method of claim 33, wherein the carbon dioxide fixing material is heated to a temperature of at least about 600° C.

* * * * *